June 13, 1967  H. L. BOWDITCH ET AL  3,325,098
BALANCING APPARATUS FOR COMPUTERS AND THE LIKE
Filed July 2, 1965  7 Sheets-Sheet 1

INVENTORS
Hoel L. Bowditch
BY Philip H. Sanford
Curtis Morrie + Safford
ATTORNEYS

United States Patent Office 3,325,098
Patented June 13, 1967

3,325,098
BALANCING APPARATUS FOR COMPUTERS
AND THE LIKE
Hoel L. Bowditch, Foxboro, and Philip H. Sanford, Walpole, Mass., assignors to The Foxboro Company, Foxboro, Mass.
Filed July 2, 1965, Ser. No. 469,259
32 Claims. (Cl. 235—200)

This invention relates to apparatus for performing mathematical computations such as multiplication, division and the like and, more particularly, to apparatus adapted to receive one or more analog input signals equivalent to numerical values and to produce an analog output signal representing the numerical value of the result of a particular mathematical computation using the value(s) of the input signal(s).

Computers capable of performing various mathematical operations are known. For example, a pneumatic force balance computing device is disclosed in U.S. Patent No. 3,086,702. In that device, two pneumatic signals are directed to respective bellows which apply corresponding forces axially and transversely to a force bar. At one end of the bar is a bearing point through which, by means of a restraining element pivoted thereat, a reaction force whose direction is variable is developed to balance the forces applied to the bar. The direction of the reaction force is determined by a pneumatic signal to a bellows acting on the restraining element. Appropriate pneumatic sensing and feedback means permit the three forces ultimately acting on the bar to be balanced, read out and proportioned to numerical values. More specifically, the restraining element in the balanced condition is at an angle to the longitudinal axis of the force bar and the ratio of the laterally acting force to the axially acting force is proportional to the tangent of that angle. By means of mechanical linkage with the restraining element, the tangent of that angle is made directly proportional to the pneumatic signal controlling the linkage. Thus, the following relationship exists in the force balanced condition: the value of the restraining element controlling signal is proportional to the ratio of the laterally acting signal value to the axially acting signal value, which can be expressed conveniently as $C = A/B$.

An object of this invention is to provide improved pneumatic computers of the general type described in the above-mentioned patent. It is a more specific object to provide such pneumatic computers having improved accuracy. Still another object is to provide computers requiring a relatively small amount of time and labor to calibrate and which remain in calibration over extended periods of use.

Other objects, aspects and advantages of the invention will in part be pointed out in, and in part apparent from, the following description considered together with the accompanying drawings, in which.

Figures 1, 2:
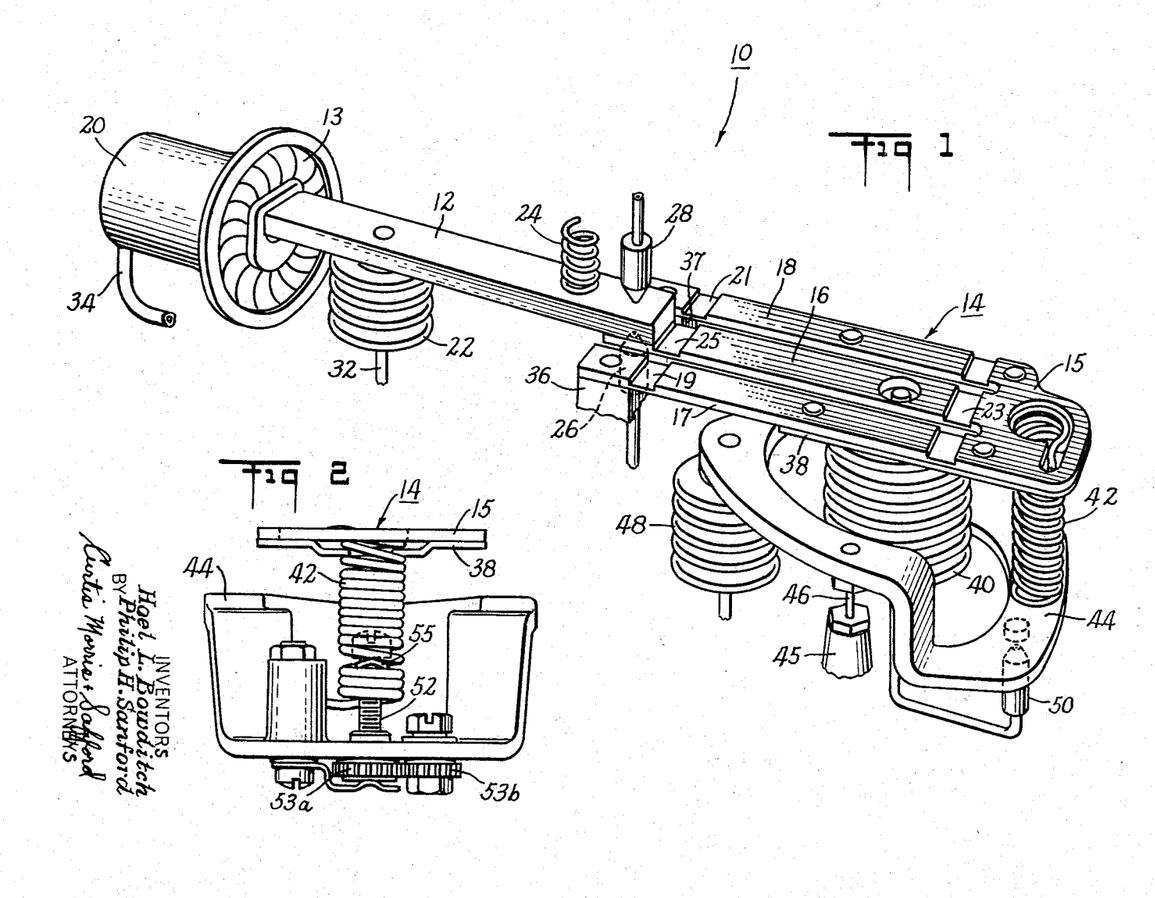
FIGURE 1 is a perspective showing the force balancing apparatus of a computer according to this invention.
FIGURE 2 is an elevation showing the balancing apparatus of FIGURE 1 from the right.

Referring now to FIGURE 1, the force balancing apparatus 10 comprises a force bar 12 the left-hand end of which is secured to a diaphragm 13 forming one wall of a chamber 20 to which an air pressure signal can be fed through a pipe 34. Thus, diaphragm 13 applies to bar 12 an axially directed force directly corresponding to that air pressure signal. A transversely directed force is applied to the underside of force bar 12 by a bellows 22.

These two forces applied to bar 12 are balanced by an appropriately directed reaction force developed by a three-element motion-restraining structure generally indicated at 14. The two outer elements 17 and 18 of this structure are connected to respective posts 36 and 37 by flexures 19 and 21 permitting essentially frictionless pivotal movement of the entire structure about these posts within a limited range of movement, e.g., about six degrees. The remote ends of outer elements 17 and 18 are rigidly attached to a head piece 15 which, together with elements 17 and 18 forms a generally U-shaped yoke.

The center element 16 is attached by a flexure 23 to the head piece 15 and by another flexure 25 to the end of the force bar 12, thereby accommodating slight pivotal movements of both the center element 16 and the force bar 12 with respect to the yoke formed by the outer elements 17 and 18.

The various flexures 19, 21, 23 and 25 are integral with the corresponding elements of structure 14, and are formed by making milled, ground cuts through all three elements 16, 17 and 18 to a depth sufficient to provide adequate flexibility at the milled region. Since for the present computer the outer elements 17 and 18 must be rigidly secured to the head piece 15, a U-shaped plate 38 is secured to the underside of these elements and the head piece, thus preventing any flexing between them. Even with this alteration, the forming of the structure 14 with its associated flexures is an economical operation.

The angular position of the yoke about flexures 19 and 21 is controlled by a large bellows 40 pressing against the underside of the two outer elements 17 and 18, in combination with a tension spring 42 fastened to the end of the head 15. The arrangement is such that the vertical displacement of head 15 is effectively linearly proportional to the force developed by bellows 40, within the operating range of the instrument.

When the forces on bar 12 are in balance, the yoke 15, 17 and 18 is so positioned by bellows 40 that the tangent of the angle $\theta$ (see FIGURE 5) between the force bar 12 and the center restraining element 16 is directly proportional to the ratio of the forces developed by bellows 22 and diaphragm 13, these two forces being referred to herein as forces (A) and (B), respectively. The force of bellows 40 required to achieve this balanced condition is referred to herein as (C). Since with very small angles, the tangent of $\theta$ is very nearly directly proportional to (C), it follows that $(A)/(B)$ is effectively equal to $k(C)$, where $k$ is some constant of proportionality. Written in another form, (A) equals $k(B)(C)$, so that force (A) is a measure of the product of the forces (B) and (C).

When the instrument is arranged to multiply, the two input signals to be multiplied are represented by the forces developed by diaphragm 13 and bellows 40. The condition of balance of the force bar 12 is sensed by the usual air nozzle 26 mounted beneath the force bar and arranged to operate a conventional pneumatic rebalance system (not shown herein in detail. In this system, the nozzle 26 is connected through a line restrictor to a source of air under pressure, typically 20 p.s.i.g. The nozzle also is connected to the input of a pneumatic relay so that the relay output is proportional to the nozzle back pressure, the latter being a function of the spacing of the nozzle from the force bar. The relay output is directed to the bellows 22 to control the transverse force applied to the force bar.

If the forces on bar 12 become unbalanced, e.g., due to a change in pressure in chamber 20, the bar will tend to pivot about diaphragm 13 so as to move closer to or further away from the nozzle 26. When this occurs, the nozzle back pressure will change, thus altering the pressure in bellows 22 so as to restore the condition of force balance. Since the nozzle back pressure varies over its entire range with a change in spacing of less than about 0.001 inch, it will be evident that the amount of movement of bar 12, as it shifts to its new position of balance, is extremely small. When the forces are rebalanced, the altered pressure in bellows 22 [force (A)], will be proportional to the new product of forces (B) and (C) as developed by diaphragm 13 and bellows 40.

It will be evident that all of the pivotal movements of force bar 12 and the three elements of support structure 14 are accommodated entirely with flexures, i.e., without the use of any friction-type bearings. This provides a very high accuracy of computation since it eliminates errors due, for example, to the dead space and friction inherent in sliding surface bearings, regardless of how finely constructed. This all-flexure construction was made possible as a result of the concept that the entire operating range of the instrument could be handled within a relatively few degrees of movement of support structure 14, providing that the relative magnitudes of the forces (A) and (B) were suitably adjusted. Although the normal tendency would be to use a large amount of motion of the force bar restraining elements (because with limited movements error-producing effects tend to be relatively magnified), it has been found nevertheless that the overall operation is improved by the present construction due to the fact that the movement is sufficiently limited that it can be accommodated entirely by non-friction bearings of the flexure type.

Since the force produced by bellows 40 depends not only on its internal pressure but, to some degree, on how far the bellows has been distended, i.e., on the angular position of support structure 14, it may be desirable in some applications to provide means for assuring that the bellows force is directly proportional to an input pressure signal. This is accomplished in the present embodiment with a servo-balancing device by connecting the bottom of spring 42 to the right-hand end of a pivotally mounted rocker beam 44, the other end of which receives the force developed by a small input bellows 48 to which the input pneumatic pressure signal is directed. A sensing nozzle 50 mounted beneath the right-hand end of beam 44 detects any condition of unbalance and is connected to bellows 40 to maintain the pressure thereof at a level to assure balance of beam 44.

Since beam 44 never moves more than about 0.001 inch, the input bellows 48 is not distended nor compressed as the instrument varies over its input range. Thus the force of bellows 48 is essentially directly proportional to its applied pressure. The tension force of spring 42 is directly proportional to the input bellows force, because beam 44 is held in balance. Put another way, the force applied by bellows 40 to the yoke 15, 17 and 18 corresponds directly to the input pressure signal at bellows 48 regardless of changes in angular position of the structure 14.

Beam 44 is pivotally mounted on respective upstanding wire segments 46 which are circular in cross-section. These wire segments bend with a flexing movement to provide an essentially frictionless bearing for the beam 44, thus further enhancing the accuracy of computation.

FIGURE 2 additionally shows within the spring 42 a screw 52 accessible from above to adjust the span of the flexure structure 14. The screw has a spacer 55 between the coils of the spring 42. Turning the screw alters the number of active coils of the spring 42. A pair of engaging rotatable gears 53a and 53b on the lower end of the screw 52 and the beam 44, respectively, are for zeroing the position of the flexure structure.

Figure 3:
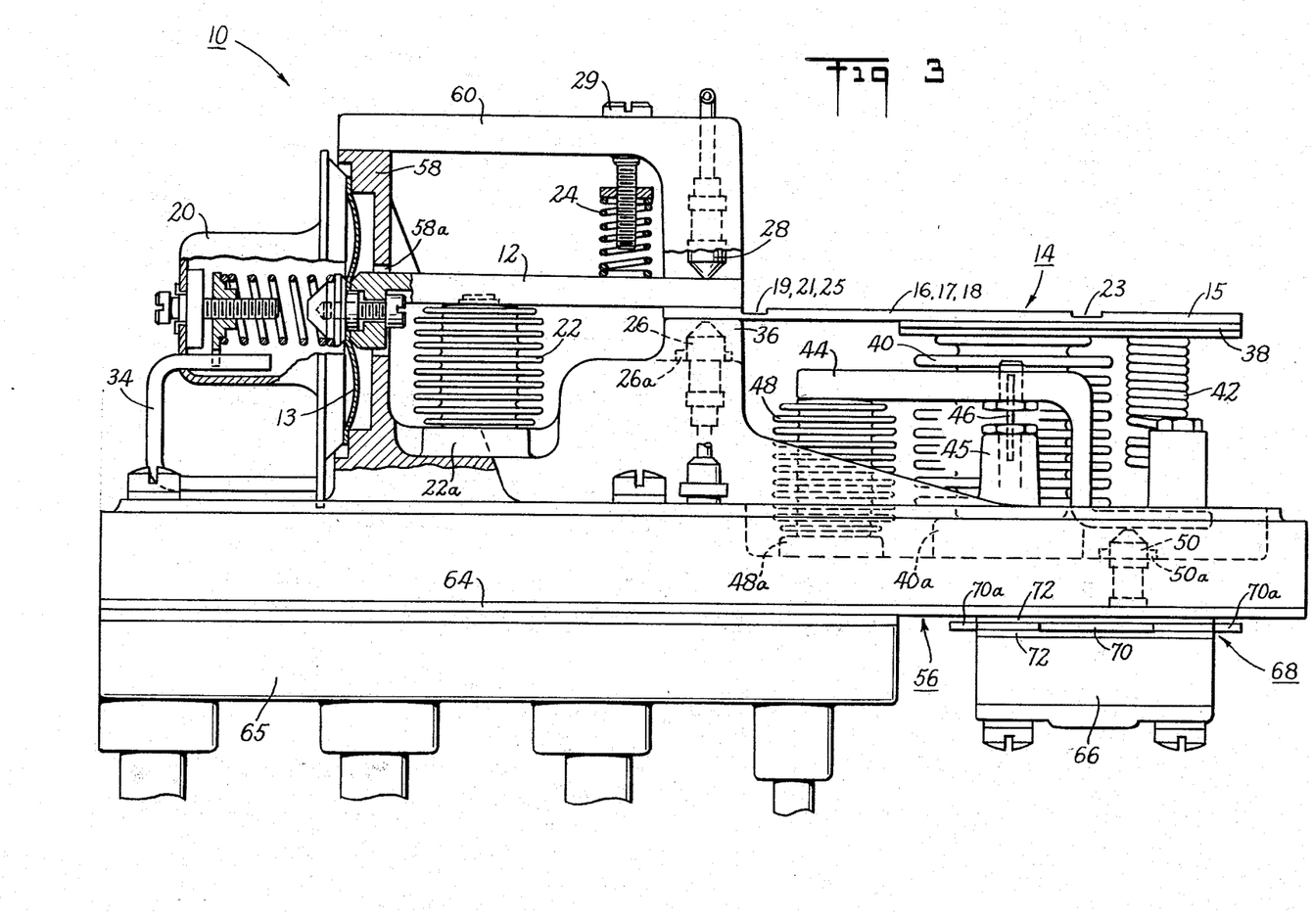
FIGURE 3 is an elevation showing a computer according to this invention having the balancing apparatus shown in FIGURE 1.
Figures 4, 5:
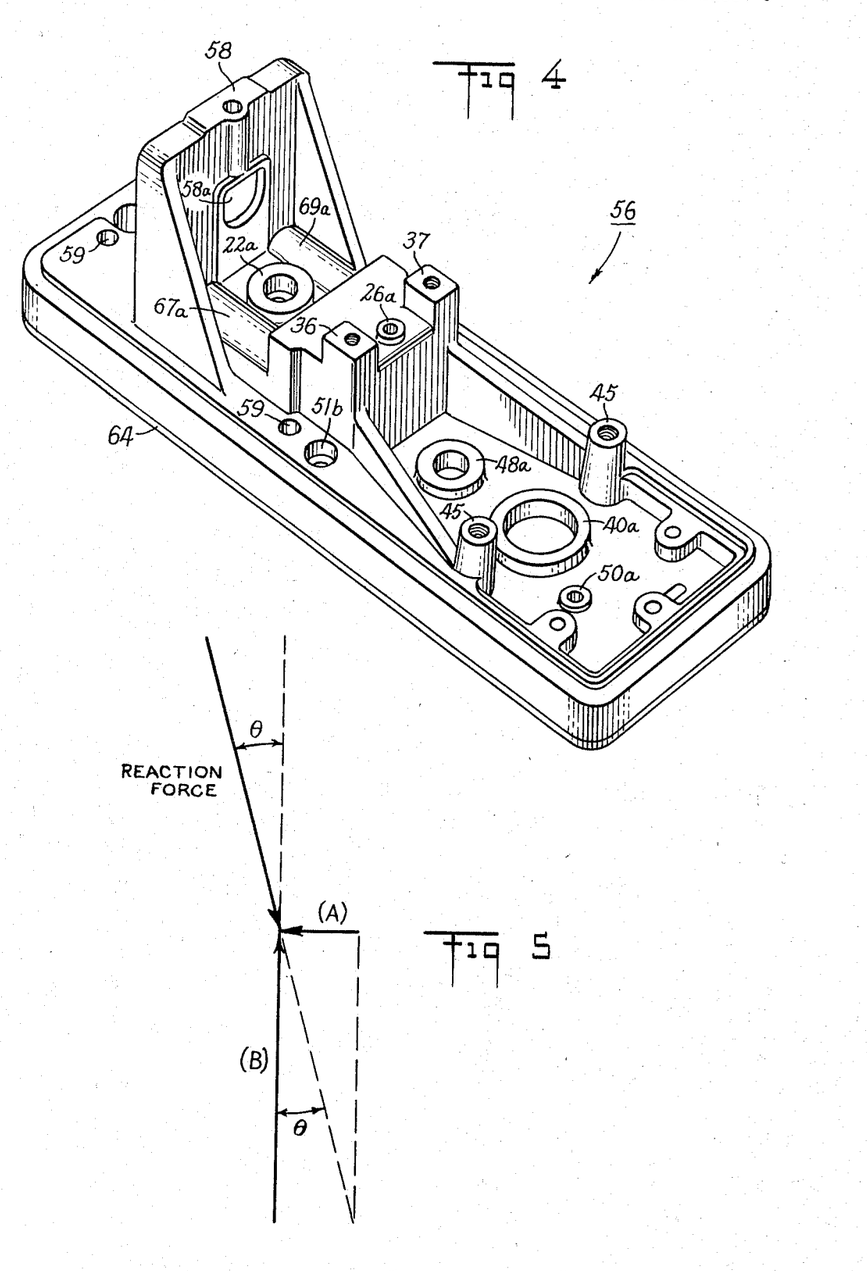
FIGURE 4 is a perspective showing a computer base and support for the balancing apparatus.
FIGURE 5 is a vector diagram showing the relationship of the balanced forces applied to the force bar of the balancing apparatus.

FIGURE 4 illustrates the base 56 of the computer. An upstanding frame 58 supports the chamber 20 and diaphragm 13, and has a slot 58a through which the force bar 12 passes. The base 56 has circular seats 22a, 40a and 48a for the bellows 22, 40 and 48; anchor posts 36 and 37 for the flexure structure 14; and pedestals 45 for the wire supports 46 for the beam 44. Also, the base has seats 26a and 50a for the rebalance nozzle 26 and the beam rebalance nozzle 50. A bracket 60 (see FIGURE 3) extends from the frame 58 to the posts 36 and 37 and supports a biasing spring 24 for the force bar 12 and an alternative rebalance nozzle 28. The "zero" position of the force bar 12 is adjusted by altering the compression on the spring 24 with a screw 29.

Figure 6:
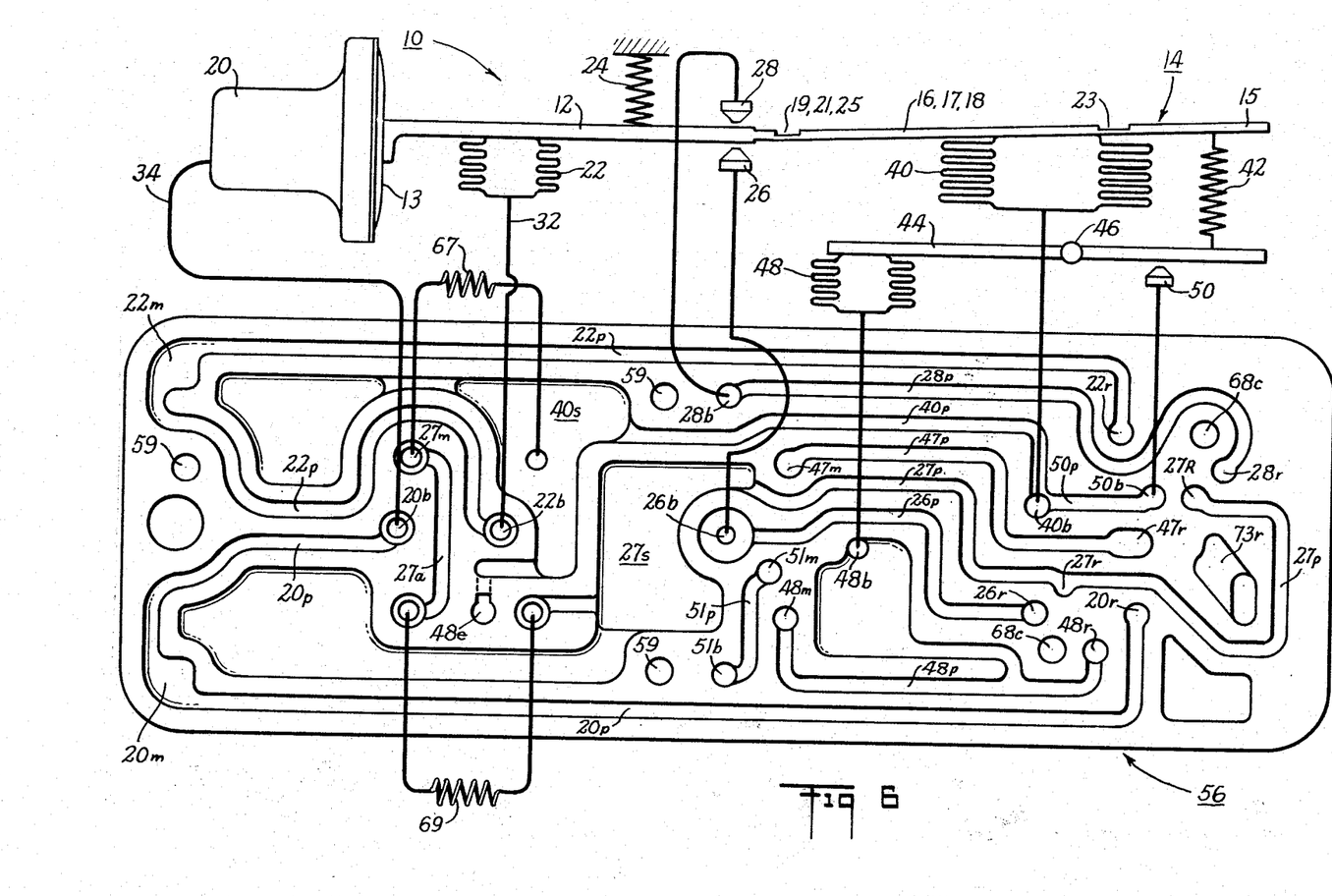
FIGURE 6 is a plan from below showing the base of FIGURE 4 and a schematic showing the balancing apparatus correlated to the base.

FIGURE 6 shows the underside of the base 56 having tortuous passages for the pneumatic signals of the computer. The base preferably is cast with recesses forming the passages therein. FIGURE 6 also shows a schematic elevation of the balancing apparatus 10 and the communication paths between the passages in the base 56 and the various balancing components. Bores 20b, 22b, 26b, 28b, 40b, 48b and 50b in the base permit connections between the passages (indicated by the same numerals and the letter p) and the chamber 20, the bellows 22, 40 and 48 and the rebalance nozzles 26, 28 and 50.

Figure 7:
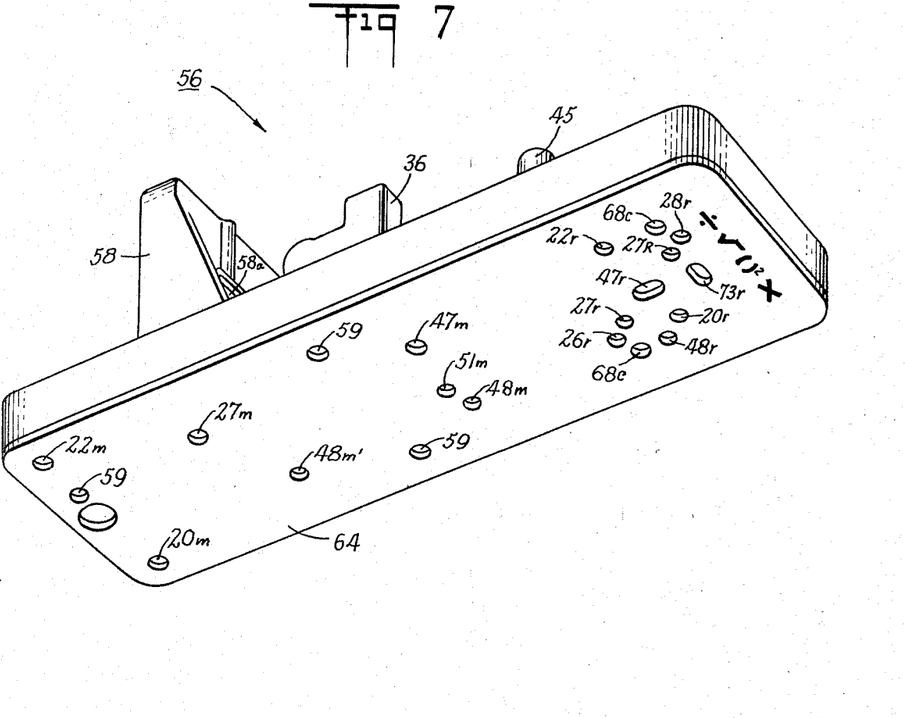
FIGURE 7 is a perspective from below showing the base of FIGURE 4 covered by a base cover plate.

FIGURE 7 shows a cover plate 64 over the underside of the base 56 closing off the various recesses to form the pneumatic passages. The cover 64 has a multiplicity of openings to connect the passages with a signal and supply manifold 65 (FIGURE 3) and a pneumatic relay 66 secured to the base 56 over the cover 64. For ease of following the various signal paths of the computer, lower case letters are used with the reference numerals to indicate the following associations: "r" for the relay 66, "m" for the manifold 65, "p" for the passages in the base and "b" for bore openings in the base leading from the passages to the various components such as bellows and nozzles. Three screw holes 59 are also provided for mounting the manifold in order to assure a secure, rock-free seating of the manifold against its sealing gasket; and two screw holes 68c are provided for the relay.

Figure 8:
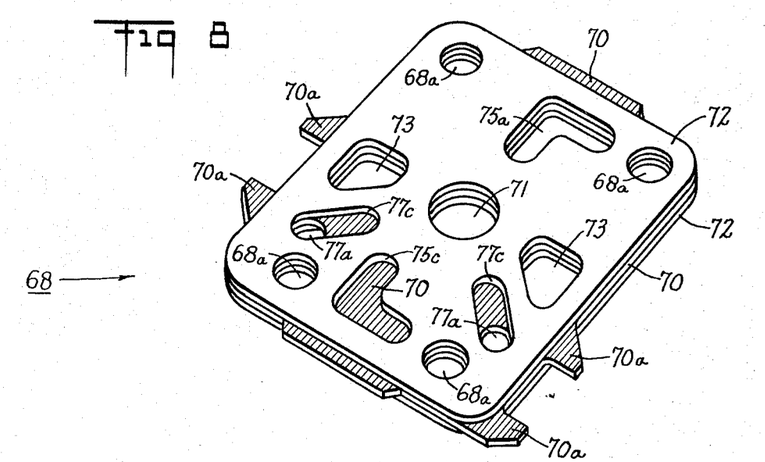
FIGURE 8 is a perspective showing the selector plate for determining the mathematical computation to be performed by the computer.

FIGURE 8 shows a selector 68 for controlling the nature of the mathematical operation to be performed. This selector is placed between the relay 66 and the base cover 64 in any one of four different orientations (as shown in FIGURES 9 to 12), and conditions the computer for multiplication, squaring, division or square-rooting, respectively.

The selector 68 has a central metal plate 70 on each side of which are laminated identical gaskets 72. Small lugs 70a projecting from the plate 70 are provided to identify the setting of the selector, as will be evident from the discussion hereinbelow. Bores 68a in each corner are to position the selector on screws which mount the relay 66 on the base 56. Pneumatic connections through the selector are provided by a center bore 71, two smaller bores 77a, two larger trapezoidal openings 73 and an L-shaped opening 75a. In addition to cut-outs for those openings, the gaskets 72 have two oblong cut-outs 77c and an L-shaped cut-out 75c. Selector openings 73 communicate with an opening 73r in the base leading to a vent. In FIG- URES 9 to 12, only the selector connections actually operative for the particular computation illustrated are shown on the selector 68.

The signal manifold 65 fits over a portion of the base cover 64 through openings of which are transmitted the pneumatic input signals as well as the required supply air pressure. For example, there is a connection from the manifold through opening 20m to passage 20p and thence through opening 20b to chamber 20. Similarly, through opening 22m to passage 22p and thence through bore 22b to bellows 22. Supply air (20 p.s.i.) is furnished to relay 66 through opening 47m which connects with passage 47p leading to opening 47r and thence through selector bore 71 to the relay. Supply air for the nozzles passes through opening 27m into passage 27a connecting with two line restrictors shown schematically at 67 and 69. These restrictors physically are mounted horizontally in the base 56 in the positions indicated at 67a and 69a in FIGURE 4, and are accessible from the opposite side of frame 58, just below the chamber 20.

The output end of restrictor 69 leads to a large volume stabilizing chamber 27s connecting to a passage 27p. This passage communicates (when selector 68 is in position for multiplying) through opening 27r, oblong cut-out 77c, opening 26r, passage 26p. and bore 26b to nozzle 26. The nozzle signal also passes through selector bore 77a to the relay 66 so that the latter can produce a corresponding output pressure signal through opening 22r, passage 22p and bore 22b to the bellows 22.

The output end of the other restrictor 67 enters a stabilizing chamber 40s leading to a passage 40p which communicates through bore 50b with nozzle 50 and through another bore 40b with the bellows 40.

Figure 9:
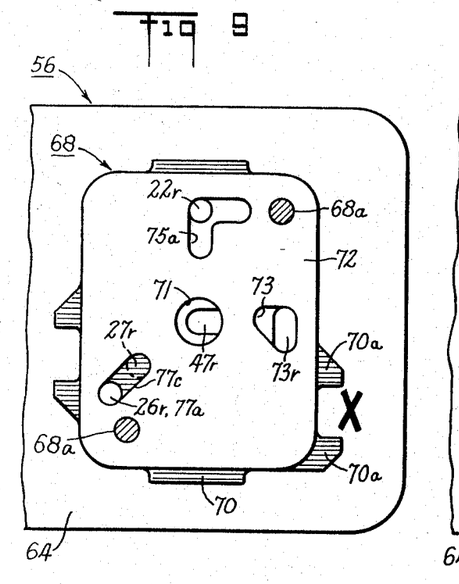
FIGURES 9 through 12 are plans from below showing fragments of the computer base and the base cover plate, and the operative portions of the selector plate positioned on the cover for the computations of multiplication, squaring, division and square rooting, respectively.

Two values to be multiplied are applied from the manifold 65 as respective pressure signals to chamber 20 and bellows 48 to provide forces (B) and (C), the selector 68 being positioned as shown in FIGURE 9. The back pressure of nozzle 26 enters the relay 66 through bore 77a and the relay output passes through openings 75a and 22r to bellows 22 to provide force (A). This same pressure signal also enters the manifold through opening 22m as the computer output signal indicating the product of the two values being multiplied.

Figure 10:
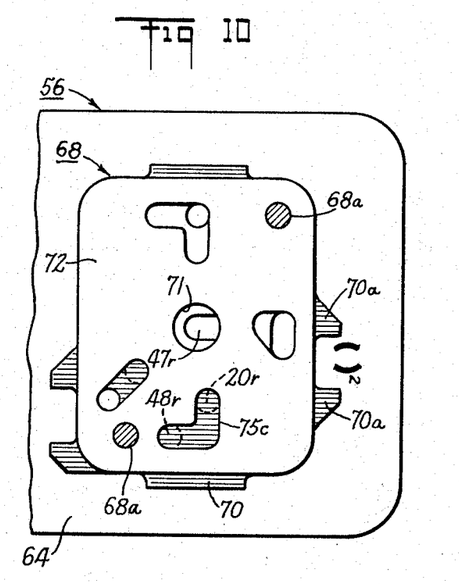

To square a value, the selector 68 is turned over to the position shown in FIGURE 10. The multiplication operation is repeated except that a single input value to be squared is entered from the manifold 65 as both force (B) and force (C). The L-shaped cutout 75c in the selector gasket 72 provides a passage between the openings 20r and 48r so that the pressure in the passages 20p and 48p will be equal. Since these passages lead to chamber 20 and bellows 48, the forces (B) and (C) will be equal.

Figure 11:
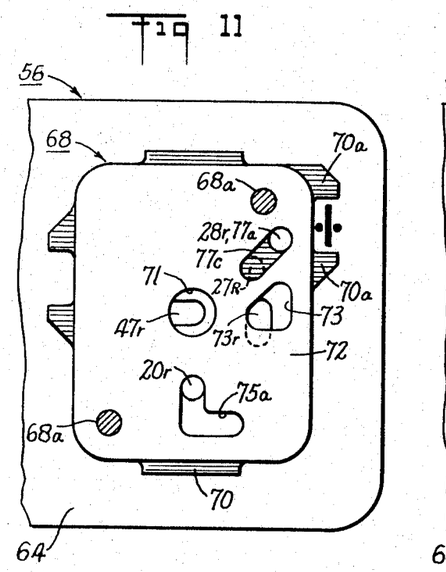

To divide, the selector 68 is positioned as shown in FIGURE 11. A signal representing the dividend is applied through the various passages to bellows 22 as force (A) and a signal representing the divisor is applied to bellows 48 to develop force (C). The rebalancing signal developed by the relay enters the passage 20p through the openings 75a and 20r to establish the rebalancing force (B) in the chamber 20, the pressure of which also is read out from the manifold 65. The relay output is controlled by the back pressure in passage 28p from the rebalancing nozzle 28 which enters the relay through openings 28r and 77a.

Figure 12:
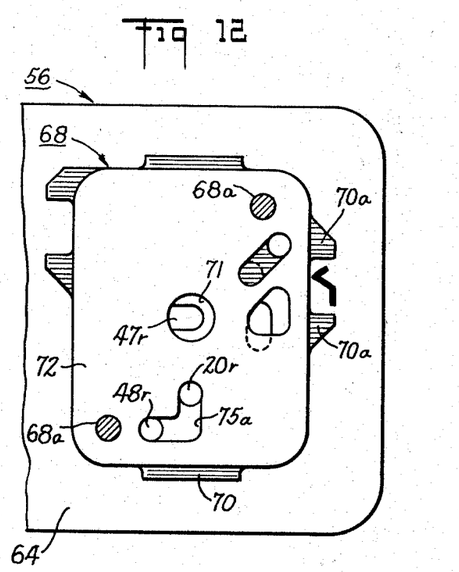

The square root of any value can be obtained by the division process by putting the value into the computer as force (A) and equating the divisor, force (C), and the quotient, force (B), i.e., by positioning the selector 68 as shown in FIGURE 12 so that the relay rebalancing output signal passes through the L-shaped opening 75a in the selector and bores 20r and 48r to the passages 20p and 48p.

A computer of the type disclosed herein also can advantageously be used as a process controller. For example, an error signal developed from the output of a condition-sensing instrument, such as a flow meter, can be fed as the input signal (B) to the computer. The computer output, in this case the rebalance pressure fed to bellows 22 to produce force (A), is directed to a process controlling element such as a flow valve. The force (C) of the computer, which relates forces (A) and (B), serves as a proportioning band setting. That is, the magnitude of (C) determines the magnitude of the controller output signal responsive to the error input signal. One important advantage of the disclosed arrangement is that the proportioning band can conveniently be controlled remotely by transmitting an appropriate pneumatic signal to the (C) input.

Figure 13:
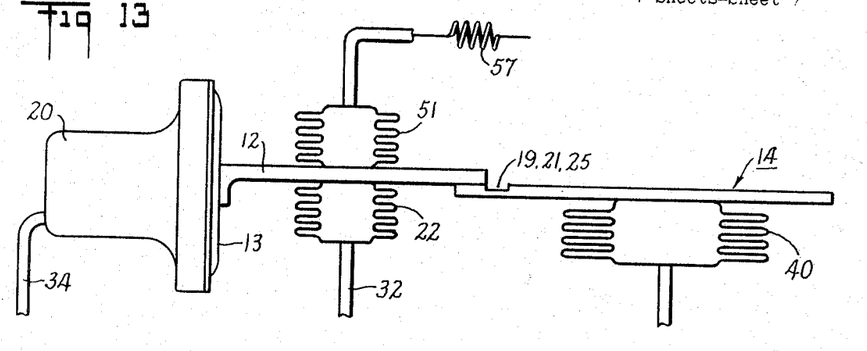
FIGURE 13 is a schematic showing a modification of the balancing apparatus of FIGURE 1.

Another embodiment of the invention in connection with the use just described provides a reset function in addition to proportioning action. The embodiment is schematically illustrated in FIGURE 13 which shows a balanceable apparatus similar to the one depicted in FIGURE 1, but with less detail.

In this modification, second lateral bellows 51 acts on the force bar 12 on the opposite side thereof from the bellows 22. The process controlling output signal of the pneumatic relay is, of course, fed to the bellows 22 to balance the apparatus. It also is fed to the lateral bellows 51, but through a line restrictor 57 so the signal to bellows 51 lags behind the signal to bellows 22. Since the forces of bellows 22 and 51 oppose one another, their difference being the rebalancing force, it will be evident that, upon the introduction of a constant input error signal, the output pressure will initially change by a corresponding amount [the proportioning factor (C)], and thereafter this change will continuously increase to provide the effect of a reset function. Ultimately, of course, the process condition will be corrected and the error signal will return substantially to zero.

The lateral bellows 51 can be used independently of bellows 22, i.e., to provide a third input force (D), to modify the basic equation to (disregarding constants of proportionality):

$$(A) = (B)(C) + (D)$$

The signal (D) to bellows 51 passes from the manifold through opening 51m, passage 51p, bore 51b and a flexible hose (not shown) to the top of the bellows. The positioning of this bellows preferably is adjustable along the force bar, by conventional means, for the purpose of altering the magnitude of the (D) factor as required for particular mathematical operations.

The computers disclosed herein also can be operated by feeding the (C) input signal directly to the large bellows 40, although with some loss in accuracy. In such case, bores 48b and 50b are not made in the base, but a passage (shown by broken lines in FIGURE 6) is milled or drilled between a recess 48e and the stabilizing chamber 40s. The input signal for the bellows 40 enters the base from the manifold 65 through opening 48m' to recess 48e and thence to chamber 40s, passage 40p and through opening 40b to the bellows 40. The line restrictor 67 is eliminated. Openings 48m' and 48m are connected within the manifold 65 so that for squaring and square rooting, the signal to the chamber 20 in passage 40p is equated to the signal to bellows 40 through the passage 48p by the selector 68.

Figure 14:
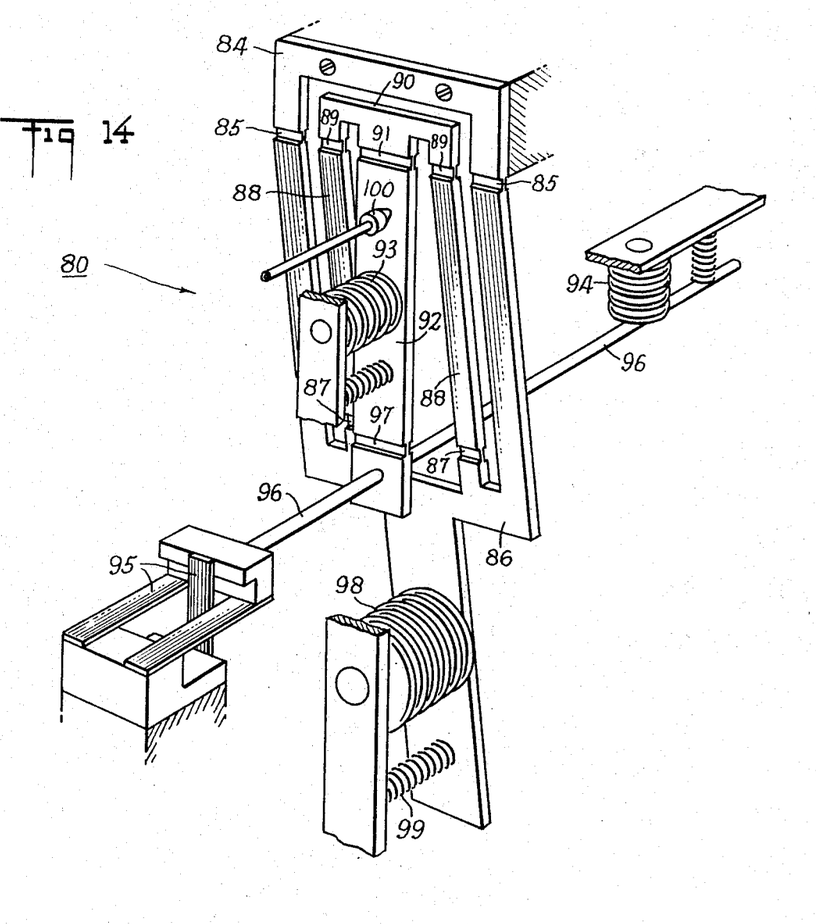
FIGURE 14 is a schematic perspective showing another force balancing apparatus of the invention.

Another embodiment of the invention is illustrated in FIGURE 14. It is in principle the same as the one previously described in that they both utilize flexures rather than bearing and/or pivot points. The structure generally indicated at 80 includes a frame member 84 having flexures 85 mounting a U-shaped yoke 86. A pair of parallel reaction arms 88 are mounted on yoke 86 by flexures 87, and are attached at their opposite ends by flexures 89 to a cross-piece 90. A flexure 91 pivotally mounts a force bar 92 to this cross-piece.

The lower end of this force bar 92 is connected by a flexure 97 to a transverse lever arm 96 anchored at one end by a cross-flexure 95. A spring-biased bellows 94 acts on the lever arm 96 to apply a longitudinal force (B) to the force bar 92. Another spring-biased bellows 93 acts against the force bar 92 to apply a lateral force (A) thereto. A third bellows 98 applies a force (C) to the yoke 86 which deflects it and the reaction arms 88, preferably not more than in the range of 5 to 7°, against spring means 99 having a substantially linear deflection/stress characteristic so that throughout the relatively small angular deflection of the yoke 86 the tangent of the angular displacement $\theta$ about the flexures 85 is very nearly directly proportional to the applied signal. A rebalancing system, including at least one nozzle 100 and the usual relay (not shown), is used to maintain the forces on bar 92 in balance. In the balanced state the moments developed by forces (A) and (B) on the reaction arms 88 about the flexure 87 are equal so that $$k_1(B)[d \sin \theta] = k_2(A)[d \cos \theta]$$

where $d$ is the length of the reaction arms 88 and, by transposition and substitution, $$(A)/(B) = k_1/k_2 \tan \theta = k\theta = (C)$$

where $k$ is a constant determined by the geometry of the apparatus. Thus the same basic relationship is established as in the first-described preferred embodiment, and it will be evident that comparable auxiliary structure can be provided to utilize this relationship for performing the desired mathematical computations.

It is to be understood that the foregoing description illustrates the invention and various specific embodiments thereof, and that numerous changes can be made by those skilled in the art without departing from the invention as limited by the prior art.

We claim:

1. For making mathematical computations and related applications, apparatus comprising a frame, a balanceable member mounted for movement with respect to said frame, first and second means for applying transversely directed forces to said member, a reaction element, a flexure means directly securing said reaction element to said balanceable member, a position control element secured to said reaction element for setting the angular position thereof about said flexure means, means mounting said control element for angular movement with respect to said frame, and means responsive to any unbalance of forces on said member for automatically effecting a rebalance of those forces.

2. For making mathematical computations and related applications, apparatus comprising a frame, a balanceable member mounted for movement with respect to said frame, first and second means for applying transversely directed forces to said member, a reaction element, means directly connecting said reaction element for angular movement to said balanceable member, a position control element secured to said reaction element for setting the angular position thereof with respect to said balanceable member, flexure means mounting said control element for angular movement with respect to said frame, and means responsive to any unbalance of forces on said member for automatically effecting a rebalance of those forces.

3. For making mathematical computations and related applications, apparatus comprising a frame, a balanceable member mounted for movement with respect to said frame, first and second means for applying transversely directed forces to said member, a reaction element, first flexure means connecting said reaction element to said balanceable member, a position control element secured to said reaction element for setting the angular position thereof about said first flexure means, a second flexure means mounting said control element for angular movement with respect to said frame, and means responsive to any unbalance of forces on said member for automatically effecting a rebalance of those forces.

4. For making mathematical computations and related applications, apparatus comprising a frame, a balanceable member mounted for movement with respect to said frame, first and second means for applying transversely directed forces to said member, a reaction element, means connecting said reaction element for angular movement to said balanceable member, a position control element secured to said reaction element for setting the angular position thereof with respect to said balanceable member, means mounting said control element for angular movement with respect to said frame, third means for applying a force to deflect said control element angularly through a small angle for full-scale operation and linearly an amount proportional to said force, and means responsive to any unbalance of forces on said member for automatically effecting a rebalance of those forces.

5. Apparatus according to claim 4 wherein said small angle is less than 7°.

6. A computing device comprising a supporting base and a force balancing apparatus mounted thereon, said force balancing apparatus including a movably mounted balanceable member, first and second signal-responsive means to produce forces acting transversely to one another on said balanceable member, a movably mounted restraining member, third signal-responsive means to produce a force acting on and to deflect said restraining member, said restraining member and said balanceable member being connected by a flexure, and re-balancing means to provide a signal to at least one of said signal-responsive means to produce a rebalancing force whereby said balanceable member is retained in substantially constant position.

7. A computing device comprising a supporting base and a force balancing apparatus including a movably mounted balanceable member, first and second signal-responsive means to produce forces acting transversely to one another on said balanceable member, a movably mounted restraining member, flexure means connecting said restraining member to said base, third signal-responsive means to produce a force acting on and to deflect said restraining member, said restraining member and said balanceable member being connected by means allowing angular displacement therebetween, and rebalancing means to provide a signal to at least one of said signal-responsive means to produce a rebalancing force whereby said balanceable member is retained in substantially constant position.

8. A force balancing apparatus comprising a force bar, a restraining structure secured to a stationary support and angularly movable with respect thereto, a reaction arm extending from said restraining structure, a flexure connecting said force bar and said reaction arm, means for applying a force longitudinally to said force bar, means for applying a force substantially transversely to said force bar, means for applying a force to said restraining structure to deflect it angularly, and rebalancing means responsive to deflection of said force bar to apply one of said forces whereby said flexure is retained in substantially constant position.

9. A force balancing apparatus comprising a force bar, a restraining structure, a stationary support, a flexure securing said structure to said support, a reaction arm extending from said structure, means allowing angular deflection connecting said force bar and said reaction arm, means for applying a force longitudinally to said force bar, means for applying a force substantially transversely to said force bar, means for applying a force to said restraining structure to deflect it about said flexure, and rebalancing means responsive to deflection of said force bar to apply one of said forces whereby said force bar is retained in substantially constant position.

10. A pneumatic computing device adapted to receive one or more input signals, to compute said signals and to produce an output signal equivalent to the result of the computation, said device comprising a base, a force bar movably mounted on said base, signal-responsive means for applying a force to said bar longitudinally, signal-responsive means for applying a force to said bar transversely, a restraining structure having a reaction arm connected to at least one support arm, a flexure connecting said force bar and said reaction arm, means mounting said support arm to said base for angular displacement with respect thereto, said flexure and said mounting means being in substantial alignment in a neutral position, signal-responsive means for deflecting said restraining structure, and rebalancing means for providing a signal to at least one of said signal-responsive means to retain said flexure and said mounting means in substantial alignment.

11. A pneumatic computing device adapted to receive one or more input signals, to compute said signals and to produce an output signal equivalent to the result of the computation, said device comprising a base, a force bar movably mounted on said base, signal-responsive means for applying a force to said bar longitudinally, signal-responsive means for applying a force to said bar transversely, a flexure structure having a reaction arm and at least one support arm connected thereto, a flexure connecting said force bar and said reaction arm, a flexure connecting said support arm to said base, said flexures being in substantial alignment in a neutral position, signal-responsive means for deflecting said flexure structure, and rebalancing means for providing a signal to at least one of said signal-responsive means to retain said flexures in substantial alignment.

12. A computer adapted to receive one or more input signals and to produce an output signal equivalent to the result of a mathematical computation of the input signal or signals comprising a force bar, first signal-responsive means to apply a force longitudinally to said force bar proportional to a signal, second signal-responsive means to apply a force transversely to said bar proportional to a signal, a reaction arm, a flexure connecting said force bar and said reaction arm, a movable yoke member connected to said reaction arm, third signal-responsive means to apply a force to said yoke member proportional to a signal to move said yoke, and rebalancing means to provide a rebalancing signal to at least one of said signal-responsive means whereby said force bar and said reaction arm are deflected with respect to each other at said flexure by said input signal or signals and said flexure is retained in substantially constant position by said rebalancing signal, said rebalancing signal being said output signal.

13. A computer adapted to receive one or more input signals and to produce an output signal equivalent to the result of a mathematical computation of the input signal or signals comprising a force bar, first signal-responsive means to apply a force longitudinally to said force bar proportional to a signal, second signal-responsive means to apply a force transversely to said bar proportional to a signal, a reaction arm, a first flexure connecting said force bar and said reaction arm, a movable yoke member, a second flexure connecting said reaction arm to said yoke member, third signal-responsive means to apply a force to said yoke member proportional to a signal to move said yoke, and rebalancing means to provide a rebalancing signal to at least one of said signal-responsive means whereby said force bar and said reaction arm are deflected with respect to each other at said first flexure by said input signal or signals and said first flexure is retained in substantially constant position by said rebalancing signal, said rebalancing signal being said output signal.

14. A computer according to claim 13 adapted to multiply two values represented by two input signals further comprising means to apply one input signal to said first signal-responsive means, means to apply the other input signal to said third signal-responsive means, and means to apply said rebalancing signal to said second signal-responsive means.

15. A computer according to claim 13 adapted to square a value represented by an input signal further comprising means to apply said input signal to said first and said third signal-responsive means, and means to apply said rebalancing signal to said second signal-responsive means.

16. A computer according to claim 13 adapted to divide a first value by a second value, said values being represented by two input signals, further comprising means to apply the input signal of the first value to said second signal-responsive means, means to apply the other input signal to said third signal-responsive means, and means to apply said rebalancing signal to said first signal-responsive means.

17. A computer according to claim 13 adapted to extract the square root of a value represented by an input signal further comprising means to apply said input signal to said second signal-responsive means and means to apply said rebalancing signal to both said first and said third signal-responsive means.

18. A computing device comprising a supporting base, a force bar movably mounted on said base, first signal-responsive means to produce a first force acting in one direction on said force bar, second signal, responsive means to produce a second force acting on said force bar in a direction transverse to said first force, a flexure structure having a reaction arm and at least one supporting arm, a first flexure between said force bar and said reaction arm, a second flexure between said reaction arm and said supporting arm, a third flexure between said supporting arm and said base, third signal-responsive means to produce a third force acting on said flexure structure to deflect it about said third flexure, means to provide an input signal to at least one of said signal-responsive means, rebalancing means to provide a rebalancing force to at least one of said three signal-responsive means, said rebalancing means having sensing means responsive to displacement of said first flexure and means to provide a signal for said rebalancing force.

19. A computing device according to claim 18 including a fourth signal-responsive means adapted to apply a fourth force to said force bar in a direction substantially opposed to said first force, and means to provide a signal to said fourth signal-responsive means.

20. A computing device according to claim 19 adapted to provide a controlling output signal responsive to an error signal further comprising a line restrictor means and wherein said error signal is an input signal to provide one of said three forces, and said rebalancing force is provided as the opposing forces, one of which is passed through said line restrictor means.

21. A computing device comprising a supporting structure, a force bar movably mounted on said structure, first signal-responsive means to produce a first force acting in one direction on said force bar, second signal-responsive means to produce a second force acting on said force bar in a direction transverse to said first force, a flexure structure having a rigid reaction arm and at least one supporting arm, a first flexure between said force bar and said reaction arm, a second flexure between said reaction arm and said supporting arm, a third flexure between said supporting arm and said supporting structure, third signal-responsive means to produce a third force acting on said flexure structure to deflect it angularly about said third flexure, means to provide at least one input signal representing a value to be computed to at least one of said signal-responsive means, and rebalancing means to provide a rebalancing force as at least one of said three forces, said rebalancing means including sensing means responsive to displacement of said force bar and means to provide a signal to at least one of said signal-responsive means, whereby said force bar is retained in substantially constant position by said rebalancing force and said rebalancing force signal represents a value equal to the result of the computation.

22. Apparatus adapted for performing mathematical operations comprising a balanceable force bar; mounting means connected to said force bar adjacent one end thereof and arranged to accommodate longitudinal movement of said force bar as well as pivotal movement thereof; first pressure-responsive means for applying to said end of said force bar a first force in a longitudinal direction; second pressure-responsive means arranged to apply to said force bar a second force in a lateral direction; a reaction element; a flexure coupling said reaction element to the other end of said force bar, said reaction element adapted to develop a restraining force opposing said first and second forces; pneumatic nozzle means fixed in position adjacent said force bar to detect any unbalance in the forces applied thereto; relay means coupled to said nozzle means; and rebalance means operable by the output pressure of said relay means for controlling at least one of said forces to maintain a balance of the forces applied to said force bar.

23. Computing apparatus adapted to receive an input including one or more variable signals and to produce an output representing a mathematical operation on said input comprising: a balanceable member; first pressure-responsive means adapted to be activated by a pneumatic signal and arranged to apply to said balanceable member a corresponding first force in one direction, said first force having a magnitude directly proportional to the pneumatic signal supplied to said first pressure-responsive means; second pressure-responsive means adapted to be activated by a pneumatic signal and arranged to apply to said balanceable member a corresponding second force having at least a component thereof in a direction perpendicular to said one direction, said second force having a magnitude directly proportional to the pneumatic signal supplied to said second pressure-responsive means; a flexure; a restraining element secured to said balanceable member by said flexure to develop a reaction force in response to said first and second forces, said restraining element being shiftable about said balanceable member to vary the direction of said reaction force; third pressure-responsive means adapted to be activated by a pneumatic signal to orient said restraining element in a position where the tangent of the angle between said one direction and the direction of said reaction force corresponds substantially directly to the pneumatic signal supplied to said third pressure-responsive means; sensing means arranged to detect any change in the forces applied to said balanceable member and to produce a corresponding pneumatic rebalance signal; signal transmission means for feeding said pneumatic rebalance signal to not more than two of said pressure-responsive means and for feeding said input to the other pressure-responsive means; and output means actuated by said rebalance signal for developing a pneumatic output signal representing the result of the mathematical operation on said input.

24. Apparatus according to claim 2 wherein said two elements are elongate in configuration and positioned side-by-side in parallel relationship.

25. Apparatus according to claim 24 wherein said reaction element is secured to said balanceable member by a second flexure means alongside of and aligned with the first-mentioned flexure means.

26. Apparatus according to claim 25 wherein said position control element includes two parallel arms on opposite sides of said reaction element, each arm being secured to said reaction element at the end thereof remote from said balanceable member.

27. Apparatus according to claim 26 wherein said reaction element includes two parallel arms each alongside a corresponding one of said control element arms, said balanceable member comprising an elongate member between said reaction element arms and at least approximately parallel thereto.

28. Apparatus according to claim 2 further comprising a second balanceable member, means to apply a signal force to said second balanceable member, means responsive to the angular position of said position control element for applying a rebalance force to said second balanceable member, sensing means for detecting any unbalance of forces on said second balanceable member, and positioning means responsive to the output of said sensing means for adjusting the position of said position control element to maintain said second balanceable member in essentially fixed position.

29. A force balancing apparatus comprising a balanceable member, a restraining structure secured to a stationary support and angularly movable with respect thereto, flexure means connecting said restraining structure to said support for angular movement, means to deflect said restraining structure angularly, a reaction arm extending from said restraining structure, means connecting said reaction arm to said balanceable member for angular movement, means for applying a first force to said balanceable member, and means responsive to deflection of said balanceable member to apply a second force thereto substantially transversely to said first force whereby said balanceable member is retained in substantially constant position.

30. A pneumatic computing device adapted to receive one or more input signals, to compute said signals and to produce an output signal equivalent to the result of the computation, said device comprising a base, a force bar movably mounted on said base, signal-responsive means for applying a force to said bar longitudinally, signal-responsive means for applying a force to said bar transversely, a restraining structure having a pair of reaction arms substantially parallel to and on opposite sides of said force bar and having a pair of support arms substantially parallel to said reaction arms and on opposite sides thereof from said force bar, flexure means connecting said force bar and said reaction arms, means connecting said reaction arms and said support arms for angular displacement with respect to one another, means mounting said support arms to said base for angular displacement with respect thereto, said flexure and said mounting means being in substantial alignment in a neutral position, signal-responsive means for deflecting said restraining structure, and rebalancing means for providing a signal to at least one of said signal-responsive means to retain said flexure and said mounting means in substantial alignment.

31. A pneumatic computing device according to claim 30 wherein flexure means connect said reaction arms and said support arms substantially in alignment in a balanced condition with the end of said force bar opposite the flexure means connecting said force bar and said reaction arms.

32. A pneumatic computing device according to claim 30 wherein flexure means mount said support arms to said base.

References Cited

UNITED STATES PATENTS 3,086,702   4/1963   Bowditch __________ 235—200

RICHARD B. WILKINSON, *Primary Examiner.*

L. R. FRANKLIN, *Assistant Examiner.*